E. K. DAY.
SCREW FOR ATTACHING METAL PLATES.
APPLICATION FILED NOV. 12, 1917.
1,301,398.
Patented Apr. 22, 1919.
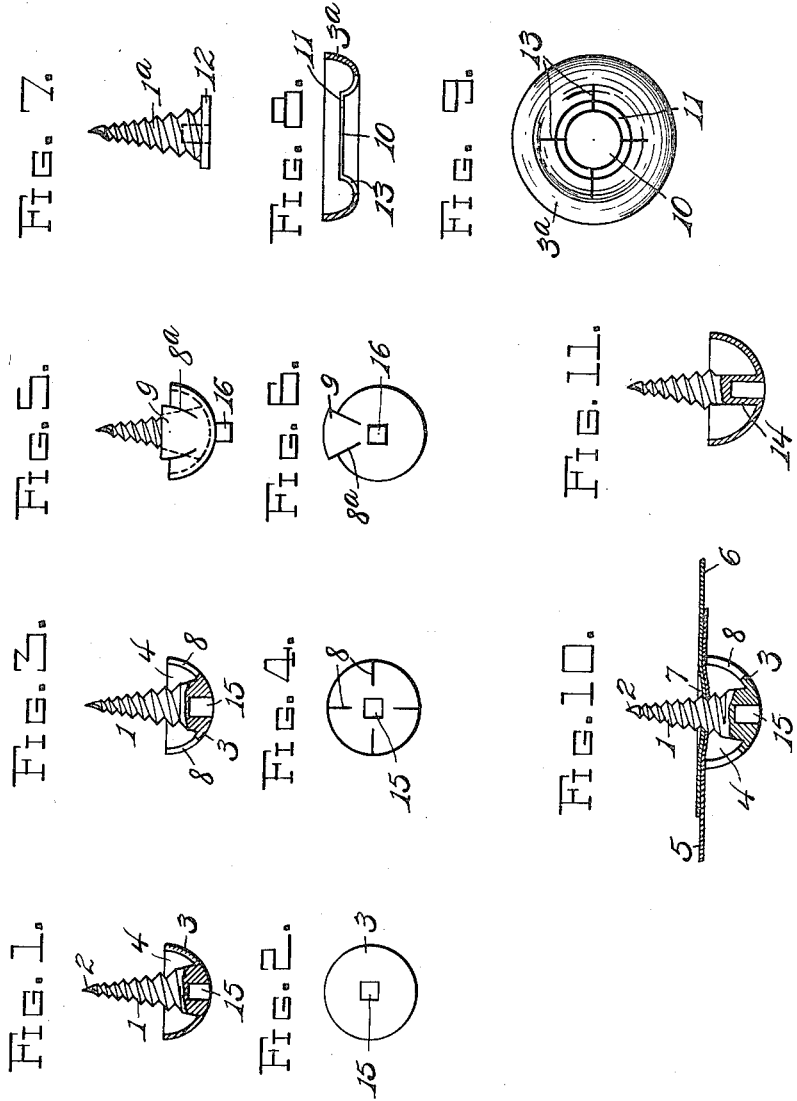

UNITED STATES PATENT OFFICE.

EDGAR K. DAY, OF WHEELING, WEST VIRGINIA, ASSIGNOR OF ONE-HALF TO H. E. DUNLAP, OF WHEELING, WEST VIRGINIA.

SCREW FOR ATTACHING METAL PLATES.

1,301,398.  Specification of Letters Patent.  Patented Apr. 22, 1919.

Application filed November 12, 1917. Serial No. 201,448.

*To all whom it may concern:*

Be it known that I, EDGAR K. DAY, a citizen of the United States of America, and resident of Wheeling, county of Ohio, and State of West Virginia, have invented certain new and useful Improvements in Screws for Attaching Metal Plates, of which the following is a specification.

This invention relates broadly to screws, and more particularly to an attaching screw for sheet-metal.

The primary object of the invention is to provide a screw for attaching sheet-metal plates in overlapped relation and for rigidly connecting such plates one to another.

A further object is to provide a screw of the character mentioned which is designed primarily for rigidly connecting those overlapped edges of metal ceiling plates which lie transversely between the parallel furring strips or other mountings, thus dispensing with the necessity for the provision of cross mountings or headers.

A still further object is to provide a headed screw of the character mentioned by means of which the overlapped portions of the plates at the point of attachment are subjected to a drawing action with respect to the screw head, which acts to slightly bow the plates at said point, producing a resilient joint which tends to maintain intimate bearing relation between said plates and said head for preventing chance retraction of the screw.

Another object within the contemplation of the invention is to provide a screw having a hollow or cup-like head with a flexible and resilient defining wall adapted to yield under tension and, consequently, to tend to maintain said screw against chance retraction.

With these and other objects in view, the invention resides in the features of construction which will hereinafter be described, reference being had to the accompanying drawings, in which—

Figures 1 and 2 are, respectively, a partial longitudinal section and an outer end elevation of a screw made in accordance with my invention;

Fig. 3 is a view similar to Fig. 1, showing a modification;

Fig. 4 is an outer end elevation of the same;

Figs. 5 and 6 are, respectively, a side elevation and an end elevation of a still further modified form;

Fig. 7 is a side elevation of the body portion of a screw formed with separable head;

Figs. 8 and 9 are, respectively, a central section and an elevation of said separable head;

Fig. 10 is a view of the screw shown in Fig. 3, illustrating its application to overlapping plates of sheet metal; and—

Fig. 11 is a partial sectional view of another modified form.

Referring to said drawings, 1 indicates the body of a screw of tapered form having a sharp point 2 for entering perforations provided in the overlapped edges of sheet metal plates, or whereby, in the absence of such perforations, the edges may be punctured. Said screw body carries a cap-like head 3 of relatively large size and which is preferably of approximately hemi-spherical form. Said head is made of hollow cupshape so that a cavity 4 of considerable capacity is afforded therein about the base portion of said screw body 1.

The body 1 is screw threaded throughout substantially its entire length, or at least so that the threads extend outward to a point within the boundaries of said hollow head—that is, within the head cavity 4— preferably terminating in proximity to the junction of said head with said body.

In practice, when the point of the screw has been introduced through registering perforations in the overlapped edges of plates, as 5 and 6 in Fig. 10, said screw is advanced by turning thereof until the edge of the hollow head 3 is engaged by the outer of said plates. Further advancing rotation of the screw operates to draw that portion of said plates which lies intermediate the screw body and the circumferential edge of the head back into the head cavity, bending said plates in a manner which produces a cup-like depression on the inner sides of said plates, as shown at 7 in Fig. 10. Due to the naturally resilient character of the plates, said screw is obviously maintained thereby under a yielding tension which serves to prevent chance retraction. Additionally, due to the thinness of the walls composing the head, the latter also yields slightly under applied tension, increasing the tendency of said screw to resist chance retraction.

The resiliency of the head may be increased by the provision therein of a plurality of radial slits, as 8 in Figs. 3 and 4; or, an elongated tongue 9 may be provided at one side of the head, as shown in Figs. 5 and 6, said tongue being partially defined by radial slits 8ª extending into the head.

In the modification illustrated in Figs. 7, 8 and 9, the screw body 1ª and head 3ª are separable, the former being designed to project through a central circular aperture 10 in the head. An annular collar or flange 12 formed at the butt end of said screw body is designed to seat upon an internal flange 11 formed in said head 3ª in defining relation to said aperture. Radial slits 13 of suitable length extending outward from said aperture serve to increase the resiliency of said head 3ª when under tension.

In the modification illustrated in Fig. 11 the threads in the body of the screw terminate within the boundary of the head at a point located but slightly inward with respect to the circumferential edge of the head, and that portion of the body behind the terminal point of said threads is cylindrical, as shown at 14 in said figure. By such construction provision is made for insuring that the plates penetrated by the screw shall finally assume closely engaging relation within the embrace of the screw head. In other words, should the outermost plate advance over the screw at a distance ahead of the other plate, the former will assume an at-rest position when it has passed over the terminus of the threads, and further turning of the screw will draw the inner plate out into close engagement with the outer plate.

A socket 15, rectangular in form, is preferably provided in the outer end of the screw, the same extending longitudinally into the screw body through the head and being adapted for the reception of the similarly shaped point of a driving instrument or tool. Or, instead of such socket, the head of the screw may have an integral outwardly extending stem 16, shown in Figs. 5 and 6, rectangular in cross section, adapted to be engaged by a socketed driving instrument or tool.

While the screw hereinbefore described is designed primarily for attaching metal ceiling plates and the like, it is also admirably adapted for attaching roofing plates and other plates exposed to the weather. As is well known, when such weather-exposed plates are fastened in the usual manner, moisture collects about the heads of the attaching nails or brads and finds its way through the apertures in which the attaching devices are located. This may be wholly obviated by employing the hollow headed screw herein described with a roofing cement filling the head cavity 4.

What is claimed is—

1. A screw for attaching metal plates, comprising a threaded body and a cap-like hollow head, said body having the threads thereof extending to a point within the hollow of said head, said screw having axially disposed means adapted for engagement with a driving tool whereby it may be advanced for drawing underlying portions of penetrated plates into cupped relation to said head.

2. A screw for attaching sheet-metal plates, comprising a threaded body and a cap-like hollow head having resilient walls, said body having the threads thereof extending to a point within the hollow of said head, the outer end of the screw being provided with axially disposed means adapted to be engaged by a driving tool whereby said screw may be advanced to a point where said walls are placed under yielding tension.

3. A screw for attaching sheet metal plates, comprising a threaded body and a cap-like hollow head of substantially hemispherical form shaped for positive engagement with a driving tool, said body having the threads thereof extending to a point within the hollow of said head whereby, when said screw is advanced after the engagement of its head with the penetrated plates, tension is exerted which draws portions of the latter circumscribed by said head into the hollow of said head.

4. A screw for attaching sheet metal plates, comprising a threaded body and a cap-like hollow head having radial slits therein, said body having the threads thereof extending to a point within the hollow of said head.

5. A screw for attaching sheet metal plates, comprising a threaded body and a cap-like head having an inwardly facing cavity therein encircling the butt end of said body, said body having its threads terminating on that part thereof encircled by said cavity, and said head being provided with a recess for the reception of a driving tool.

6. A screw for attaching sheet-metal plates, comprising a threaded screw body having an annular flange about its butt end, a separable resilient head for said body, said head being of hollow cup shape and having a central aperture through which said body is projected, and a flange-like seat for said body flange formed about said aperture.

In testimony whereof, I affix my signature in presence of two subscribing witnesses.

EDGAR K. DAY.

Witnesses:
H. E. DUNLAP,
W. F. KEEFER.